(12) United States Patent
Beckert et al.

(10) Patent No.: US 7,433,974 B2
(45) Date of Patent: Oct. 7, 2008

(54) VEHICLE COMPUTER SYSTEM WITH AUDIO ENTERTAINMENT SYSTEM

(75) Inventors: Richard D. Beckert, Lake Stevens, WA (US); Mark M. Moeller, Bellingham, WA (US); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 63 days.

(21) Appl. No.: 11/132,070

(22) Filed: May 18, 2005

(65) Prior Publication Data

US 2005/0209719 A1 Sep. 22, 2005

Related U.S. Application Data

(62) Division of application No. 09/004,076, filed on Jan. 7, 1998, now Pat. No. 7,085,710.

(51) Int. Cl.
  G06F 3/00 (2006.01)
  G06F 13/28 (2006.01)
  G06F 5/00 (2006.01)
(52) U.S. Cl. .......................................... 710/20; 710/22
(58) Field of Classification Search ................... 710/20, 710/22

See application file for complete search history.

(56) References Cited

U.S. PATENT DOCUMENTS

| | | | |
|---|---|---|---|
| 4,068,175 A | 1/1978 | Maniaci | |
| 4,207,511 A | 6/1980 | Radtke | |
| 4,365,280 A | 12/1982 | Crosetti et al. | |
| 4,477,764 A | 10/1984 | Pollard | |
| 4,481,512 A | 11/1984 | Tscheulin et al. | |

(Continued)

FOREIGN PATENT DOCUMENTS

EP 0056587 7/1982

(Continued)

*Primary Examiner*—Tariq Hafiz
*Assistant Examiner*—Scott Sun
(74) *Attorney, Agent, or Firm*—Lee & Hayes, PLLC

(57) ABSTRACT

A vehicle computer system has an audio entertainment system implemented in a logic unit and audio digital signal processor (DSP) independent from the host CPU. The audio entertainment system employs a set of ping/pong buffers and direct memory access (DMA) circuits to transfer data between different audio devices. Audio data is exchanged using a mapping overlay technique, in which the DMA circuits for two audio devices read and write to the same memory buffer. The computer system provides an audio manager API (application program interface) to enable applications running on the computer to control the various audio sources without knowing the hardware and implementation details of the underlying sound system. Different audio devices and their drivers control different functionality of the audio system, such as equalization, volume controls and surround sound decoding. The audio manager API transfers calls made by the applications to the appropriate device driver(s). The computer system also supports a speech recognition system. Speech utterances are picked up by a microphone and sampled at an internal sampling rate. However, the speech recognition system employs a lower sampling rate. The computer system converts microphone data from the higher internal sampling rate to the desired sampling rate by piggybacking the microphone data on command/message streams to an SPI (serial peripheral interface) of the audio DSP. The DSP performs normal low-pass filtering and down sampling on the data stream and then uses the SPI to send out the microphone data at the lower sampling rate.

9 Claims, 10 Drawing Sheets

U.S. PATENT DOCUMENTS

| | | |
|---|---|---|
| 4,489,435 A | 12/1984 | Moshier |
| 4,497,038 A | 1/1985 | Diepold-Schamitzky |
| 4,550,425 A | 10/1985 | Andersen et al. |
| 4,607,345 A | 8/1986 | Mehta |
| 4,631,746 A | 12/1986 | Bergeron et al. |
| 4,797,924 A | 1/1989 | Schnars et al. |
| 4,868,715 A | 9/1989 | Putman et al. |
| 4,895,326 A | 1/1990 | Nimpoeno et al. |
| 4,911,386 A | 3/1990 | Putman et al. |
| 4,991,217 A | 2/1991 | Garrett et al. |
| 5,060,229 A | 10/1991 | Tyrell et al. |
| 5,104,071 A | 4/1992 | Kowalski |
| 5,143,343 A | 9/1992 | Katz |
| 5,198,696 A | 3/1993 | Dennis |
| 5,316,868 A | 5/1994 | Dougherty et al. |
| 5,317,567 A | 5/1994 | Champion |
| 5,424,709 A | 6/1995 | Tal |
| 5,488,283 A | 1/1996 | Dougherty et al. |
| 5,559,793 A | 9/1996 | Maitra et al. |
| 5,569,997 A | 10/1996 | Berger |
| 5,610,376 A | 3/1997 | Takagi et al. |
| 5,627,547 A | 5/1997 | Ramaswamy et al. |
| 5,641,953 A | 6/1997 | Fisher, Jr. |
| 5,671,445 A * | 9/1997 | Gluyas et al. .................. 710/53 |
| 5,701,347 A | 12/1997 | Daniels et al. |
| 5,996,032 A * | 11/1999 | Baker .......................... 710/62 |
| 6,047,337 A * | 4/2000 | Smith .......................... 710/23 |
| 6,055,619 A * | 4/2000 | North et al. .................... 712/36 |
| 6,064,792 A * | 5/2000 | Fox et al. ...................... 386/46 |
| 2003/0051136 A1 * | 3/2003 | Curtis et al. ................. 713/163 |

FOREIGN PATENT DOCUMENTS

| | | |
|---|---|---|
| WO | WO 97/28679 | 8/1997 |

\* cited by examiner

VEHICLE COMPUTER SYSTEM WITH AUDIO ENTERTAINMENT SYSTEM

RELATED APPLICATION

This application is a divisional application claiming priority from the co-pending U.S. patent application Ser. No. 09/004,076 filed Jan. 7, 1998, entitled "Vehicle Computer System with Audio Entertainment System".

TECHNICAL FIELD

This invention relates to audio entertainment systems for vehicles. More particularly, this invention relates to a vehicle computer system that implements an audio entertainment system.

BACKGROUND

Modern vehicles are typically equipped with several independent electronic systems. For instance, most modern vehicles have a sound system and a security system. Most late model vehicles are also constructed with a diagnostic system that analyzes performance of the vehicle's engine, transmission and fuel system, and other components (1996 or later for OBD II, 1993 or later for OBD I). In some recent models, vehicles are being equipped with a navigation system that incorporates a global positioning system (GPS) receiver to receive signals from a satellite network for computing coordinates that locate the vehicle over the surface of the earth with regard to longitude, latitude, and altitude. Cellular communications systems have also been added to vehicles. These communications systems enable the vehicle driver or occupant to transact telephone calls from their vehicle.

While these various electronics systems have proven useful to vehicle users, there is a drawback in that the systems are unrelated and incompatible. Each system employs separate proprietary dedicated processors or ASICs (application specific integrated circuits) which execute incompatible proprietary software. If a vehicle owner would like to add a security system to his/her vehicle, the owner must purchase an entire security system from one of the vendors and have it custom installed. There is no way to add security functionality to an existing electronics system, such as the navigation system or the sound system.

U.S. patent application Ser. No. 08/564,586 entitled "Vehicle Computer System," which was filed on Nov. 29, 1995 in the names of Richard D. Beckert, Mark M. Moeller, and William Wong, describes a vehicle computer system that is capable of integrating these diverse and separate systems as well as offering a general purpose computing platform that allows for easy expandability. The vehicle computer system provides an open hardware architecture and supports an open platform operating system. The open platform operating system supports multiple different applications that can be supplied by a software vendor. For instance, the operating system can support applications pertaining to entertainment, navigation, communications, security, diagnostics, and others. In the preferred implementation, the operating system is a multitasking operating system capable of concurrently running multiple applications.

This invention is directed to the audio entertainment system implemented by the vehicle computer system.

SUMMARY

This invention concerns a vehicle computer system, and more particularly, the audio entertainment aspects of the system. The vehicle computer system has three modules: a support module, a computer module, and faceplate module. The support module is formed as part of a stationary base unit of the housing that resides in the vehicle dashboard or other location. It has its own logic unit that can be implemented in a field programmable gate array (FPGA), application specific integrated circuit (ASIC), customized processor, or the like. The support module also has an audio signal processor, such as an audio digital signal processor (DSP), which performs the signal processing for audio data.

The computer module can be a separated module attached to the support module or its functionality integrated into the support module. The computer module has a processor that runs an operating system. The computer module and support module are interfaced using a multi-bit bus, such as a PCI bus. The faceplate module is detachably connected to the support module. The faceplate module has a logic unit of its own to control a display and a keypad, and optionally a RF transceiver such as a cellular phone and a two-way pager. The faceplate and support modules are connected using a high-speed serial connection.

The audio entertainment system is primarily supported by the logic unit and audio DSP of support module. The support module can accommodate multiple audio sources such as CD player, CD changer, AM/FM tuner, auxiliary 1, auxiliary two, computer wave outputs and a microphone. The support module receives the data from the sources, processes it in the audio DSP, and outputs the data to the speaker system or other destination, such as a USB peripheral or memory in the computer module.

The support module logic unit has an internal address/data bus structure that is independent and separate from the internal bus of the computer module. This logic unit's bus functions as the peripheral communication pathway so that data from the audio sources can be processed without intervention from the computer module. For instance, all of the audio sound generation, processing, and output can be handled through the support module while consuming minimal processing resources of the computer module.

According to an aspect of this invention, the audio entertainment system employs a set of ping/pong buffers in an I/O memory coupled to the internal address/data bus structure of the support module's logic unit to temporarily hold data being communicated between different audio devices. The logic unit has direct memory access (DMA) circuits associated with each of the audio devices to designate particular storage areas of the I/O memory to hold data received from, or to be sent to, the associated device. Audio data is exchanged through use of a mapping overlay technique, in which the DMA circuits for two audio devices read and write to the same memory buffer. While one DMA circuit is filling the ping buffer with audio data from one device (e.g., an AM/FM tuner, CD player, etc.), the other DMA circuit is reading data from the pong buffer to output to another audio device (e.g., an audio signal processor).

According to another aspect of this invention, the audio entertainment system processes the digital audio data at an internal sampling rate (e.g., 44.1 kHz) determined by a master clock rate derived from a 48 MHz clock and a software adjustable divider register in the support module. Data being transferred from the buffer to the audio DSP for processing is sampled at this rate. However, an audio source device operating under its own clock signal may write audio data into the memory buffer at a rate that may not exactly match the output DMA clock rate. The audio entertainment system software adjusts the divider register to manipulate the master clock rate to the CODEC in order to synchronize the data write and read operations into the ping/pong buffer.

According to another aspect, the computer system provides an audio manager API (application program interface) to enable applications running on the computer to control the various audio sources without knowing the hardware and implementation details of the underlying sound system. Different audio devices and their drivers control different functionality of the audio system, such as equalization, volume controls and surround sound decoding. The audio manager API transfers calls made by the applications to the appropriate device driver(s).

Another aspect of this invention concerns a technique to handle voice data received from the microphone for input to a speech recognition system. The speech utterances picked up by the microphone are sampled at the 44.1 kHz sampling rate supplied by the CODEC. However, the speech recognition system employs a different sampling rate, such as a significantly slower 11 kHz sampling rate. Rather than add a separate A/D converter for sampling microphone data (which would add cost), the audio DSP converts microphone data from the higher 44.1 kHz sampling rate to the desired 11 kHz. The system makes use of an SPI (serial peripheral interface) of the audio DSP to piggyback the microphone data with command/message streams. The DSP performs normal low-pass filtering and down sampling on the data stream and then uses the SPI to send out the microphone data back out at its new 11 kHz sampling rate piggybacked with the message stream.

BRIEF DESCRIPTION OF THE DRAWINGS

The same reference numerals are used throughout the drawings to reference like components and features.

DETAILED DESCRIPTION

This invention is directed to an audio architecture for an audio entertainment system. Aspects of this invention are particularly well suited for vehicle entertainment systems. For purposes of discussion, the audio architecture is described in the context of a vehicle computer system.

Figure 1:
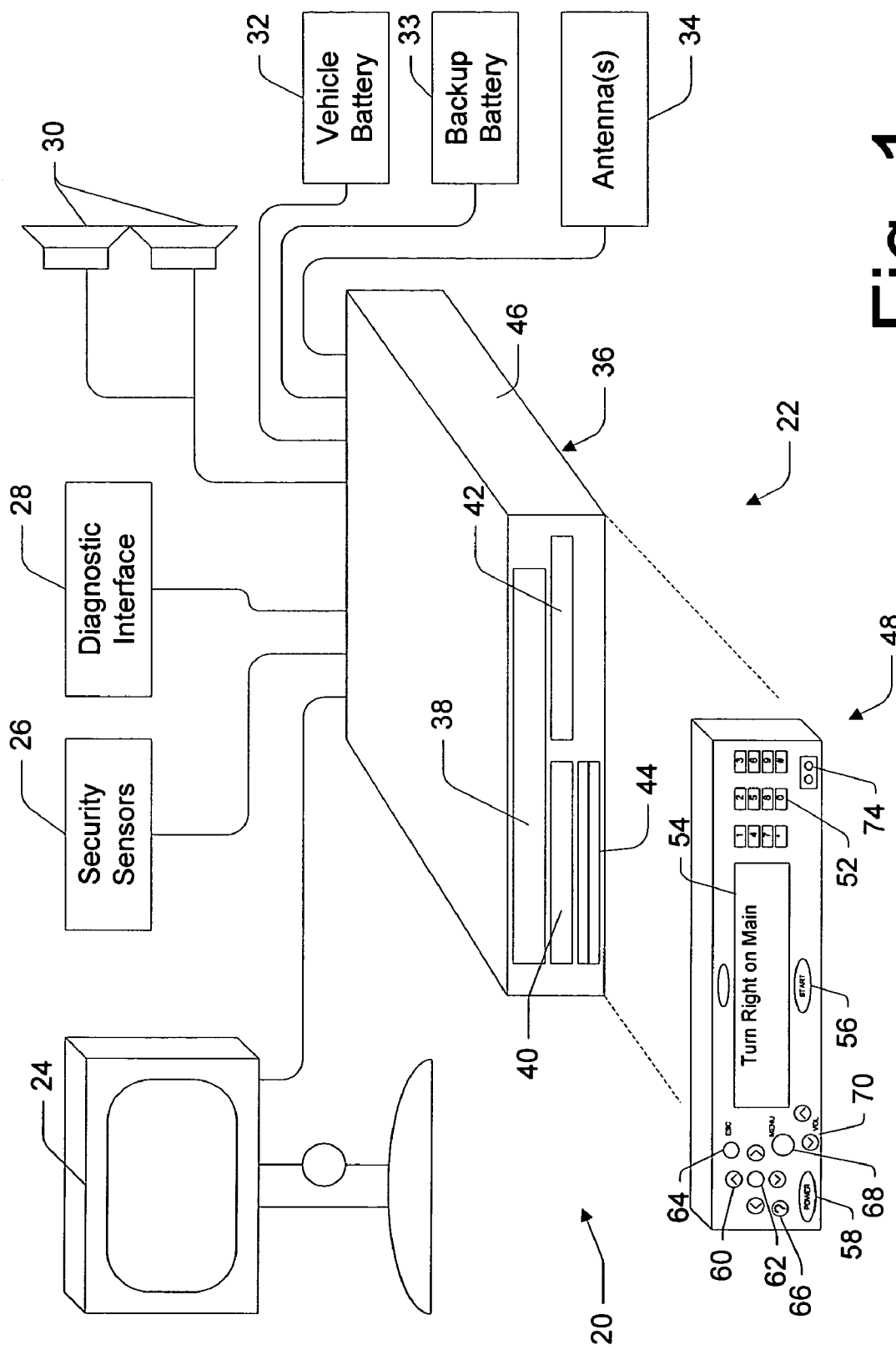
FIG. 1 is a diagrammatic illustration of a vehicle computer system.

FIG. 1 shows a vehicle computer system 20 according to one implementation of this invention. Vehicle computer system 20 has a centralized computer 22 coupled to various external peripheral devices, including an optional monitor 24, security sensors 26, a vehicle diagnostic interface 28, speakers 30, a vehicle battery 32, a backup battery 33, and antenna (s) 34. The computer 22 is assembled in a housing 36 that is sized for mounting in a vehicle dashboard, similar to a conventional automobile stereo. Preferably, the housing 36 has a form factor of a single DIN (Deutsche Industry Normen). But, it possibly could be housed in a 2 DIN unit or other special form factor for an OEM.

The computer 22 runs an open platform operating system that supports multiple applications. Using an open platform operating system and open computer system architecture, various software applications and hardware peripherals can be produced by independent vendors and subsequently installed by the vehicle user after purchase of the vehicle. This is advantageous in that the software applications do not need to be specially configured for uniquely designed embedded systems. The open hardware architecture preferably runs a multitasking operating system that employs a graphical user interface. One preferred operating system is the Windows® CE operating system sold by the Microsoft Corporation. A multitasking operating system allows simultaneous execution of multiple applications.

The computer 22 includes at least one storage drive that permits the vehicle user to download programs and data from a storage medium. In the illustrated implementation, the computer 22 has a CD ROM drive 38 which reads application-related CDs, as well as musical, video, game, or other types of entertainment CDs. The CD ROM drive 38 performs a dual role of storage drive and entertainment player. The computer 22 has an optional 3.5" floppy diskette drive 40, an optional smart card reader 42, and dual PC card sockets or compact flash 44 which accept PC card types I, II and III (formerly "PCMCIA" cards) or Compact flash cards. Also, a hard disk drive (not shown) can be included on the computer 22 for storing both application programs and user data. A DVD (digital videodisk) player may also be included in the computer 22.

The storage drives are mounted in a base unit 46 of housing 36. The base unit 46 is constructed and sized for mounting in the dashboard. Optionally, this base unit may be removable in the same fashion as a laptop computer from its associated docking station. This high-end option allows the user to take his vehicle computer to his home or office to serve as his portable PC.

The housing 36 has a detachable faceplate 48 that is pivotally mounted to the front of the base unit 46. The faceplate can be rotated to permit easy and convenient access to the storage drives. The entire faceplate unit 48 behaves as a multifunction peripheral to the computing platform.

Faceplate 48 has a keypad 52 and a graphical display 54. The display 54 is preferably a backlit LCD having a rectangular array of pixels that are individually selectable for illumination or display. The display element is a medium-resolution, bit-mapped display system having at least 10,000 pixels. In the described implementation, the array of pixels has a size of at least 64 vertical by 256 horizontal pixels. The operating system of base unit 46 interacts with faceplate keypad 52 and faceplate display 54 as peripheral devices when the faceplate 54 is attached to the base module 52.

The faceplate 48 has a start button 56 that provides the familiar "Start" functions of a Windows brand operating system. The faceplate 48 also has a power button 58, a four-position actuator 60, an "enter" button 62, an "escape" button 64, a "help" button 66, a "menu" button 68, and a volume control input 70.

The computer 22 has a speech recognition system to permit the user to verbally enter commands in a hands-free, eyes-free environment. These voice commands can be used for controlling most operating modes of the vehicle computing platform, as well as for controlling applications running on the computer. A voice-input port 72 connected with the support module may preferably be mounted on the visor or other locations so as to optimally pick up voice inputs for entry to a speech recognition system (See FIG. 3). The computer 22 also supports an IrDA (infrared developers association) transceiver port 74 mounted on the faceplate 48 to transmit and receive data and programs using infrared signals.

To load an application or data onto the computer 22, the vehicle user inserts a CD or other media (if the application is not already contained on the hard disk) into the appropriate drive and the operating system downloads the application or data therefrom. The installation process can be automatically handled by the operating system or with the assistance of command input from the user in the form of keyed sequences on the keypad 52 or verbal instructions using the voice recognition device. Another technique to load data or applications or transfer data with other computing devices is through the use of the IrDA transceiver port 74, or the wireless Internet link.

In general, the vehicle computer system 20 can be used to integrate multiple vehicle-related systems onto one open platform hardware and software architecture. For instance, the vehicle computer system 20 can serve as a multimedia entertainment system, a navigation system, a communications system, a security system, and a diagnostics system. Moreover, the vehicle computer system 20 provides additional functionality traditionally associated with desktop and laptop personal computers. For instance, vehicle computer system 20 can support address book applications, e-mail programs and appointment/schedule applications. Furthermore, the vehicle computer system 20 can be configured to operate as a server to other computing units in the vehicle to distribute games, video movies, and the like to passengers.

Figure 2:
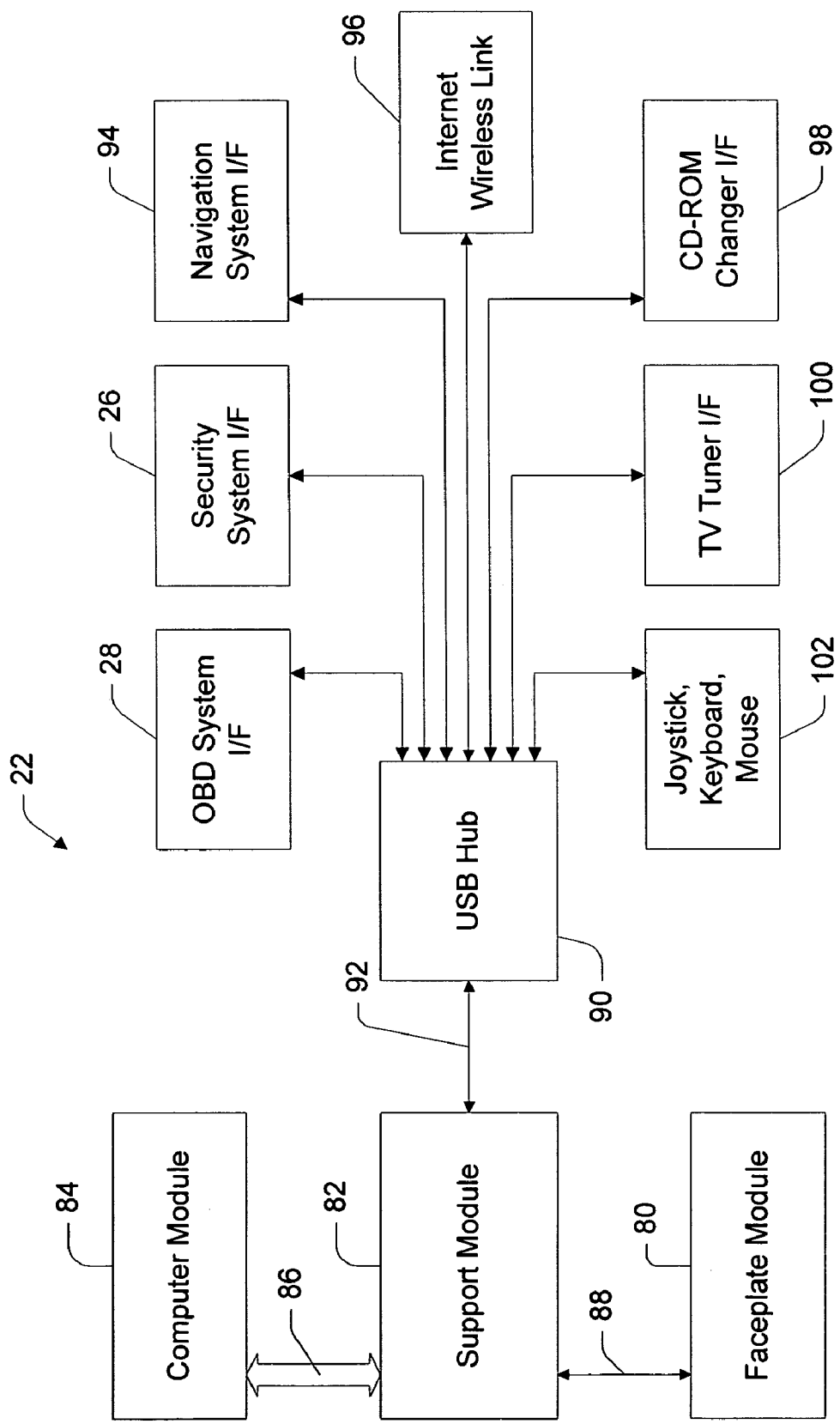
FIG. 2 is a diagrammatic illustration of the vehicle computer system interfaced with multiple external peripheral devices.

FIG. 2 shows the computer 22 according to one implementation of the invention. Computer 22 has three primary modules: a faceplate module 80, a support module 82, and a computer module 84. The computer module 84 is operatively connected to the support module 82 via a multi-bit bus 86. In the preferred implementation, the multi-bit bus is a PCI (Peripheral Component Interconnect) bus. The support module 82 and faceplate module 80 are interconnected via a high-speed serial interface 88 that supports high speed, serial data communication.

The support module 82 is also connected to a universal serial bus (USB) hub 90 via a USB serial I/F connector 92. The USB hub 90 provides connections to many peripheral devices (e.g., up to 128 devices). Example peripheral devices include the OBD (On Board Diagnostic) system 28, the security system 26, navigation system 94, a wireless link 96 to the Internet, a CD-ROM changer 98, a TV tuner 100, and user I/O devices such as a joystick, keyboard or a mouse 102. This USB hub 90 could be separate as shown in FIG. 2 or it could be integrated into one or more of the USB peripherals.

Figure 3:
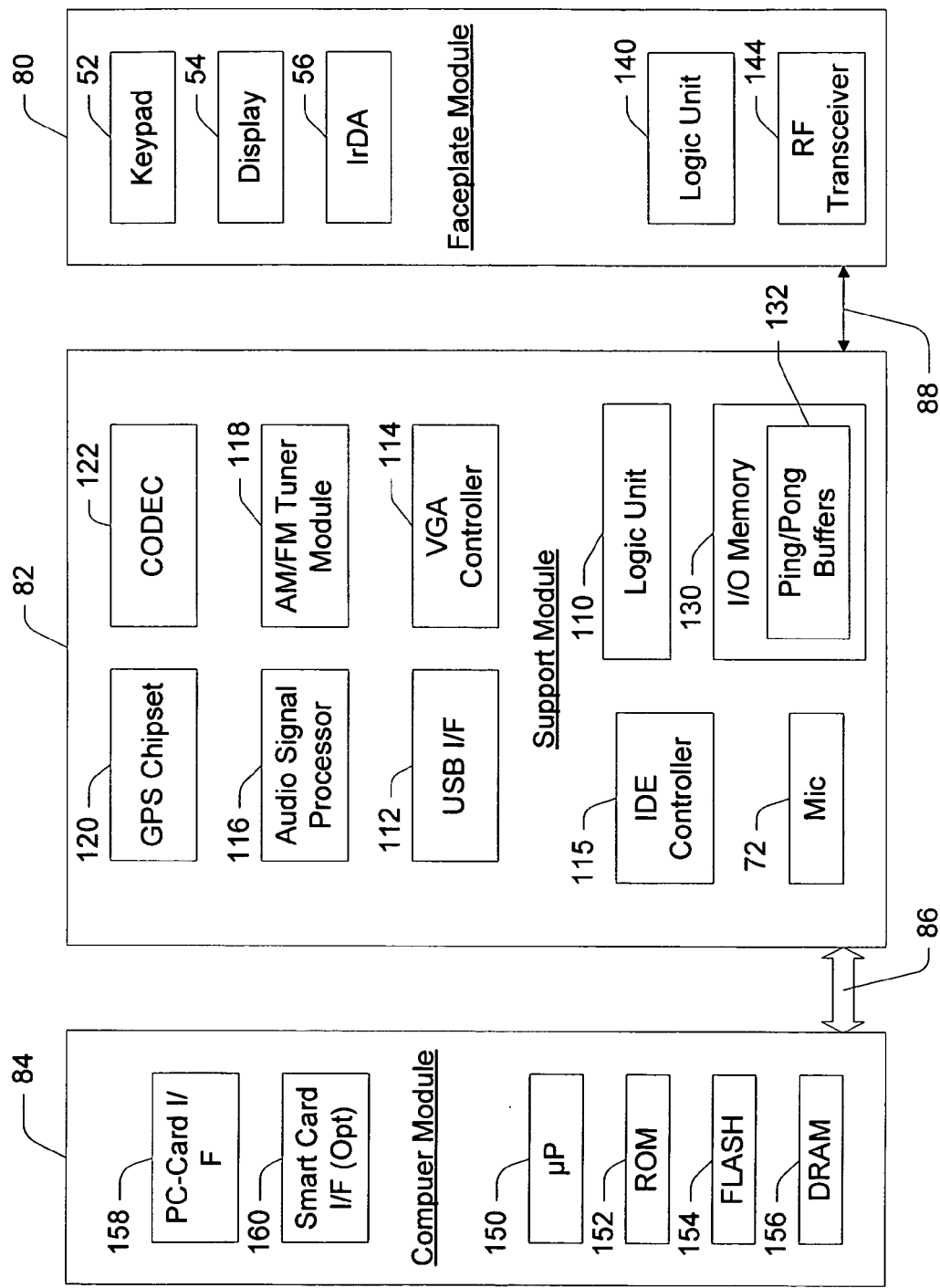
FIG. 3 is a block diagram of the vehicle computer system according to one implementation having a faceplate module, a support module, and a computer module.

FIG. 3 shows the three modules of the vehicle computer 22 in more detail. The support module 82 resides in the typically stationary base unit 46 (FIG. 1) that is mounted in the vehicle dashboard or other convenient location. The support module 82 includes a logic unit 110 which is responsible for facilitating communication among peripheral devices, establishing a master audio clock signal used throughout the vehicle computer system, and coordinating the entertainment functionality of the computer system. The logic unit 110 can be implemented as an FPGA (field programmable gate array). It is noted that the logic code for an FPGA is developed using a hardware description language, such as VHDL (IEEE standard 1076-1993), and can be recompiled for an ASIC (application specific integrated circuit) architecture. The logical unit 110 can further be implemented as a microprocessor, a RISC (reduced instruction set computing) processor, or other processing devices.

The support module 82 has several hardware interfaces. A USB interface 112 is driven from the PCI bus 86 and provides the interconnection to the various USB peripherals shown in FIG. 2. A separate USB hub may be required as shown if some of the attached peripherals do not incorporate one and more USB peripherals than supported directly by the support module are attached. An optional VGA or other high-end graphics controller 114 is provided on the support module 82 to drive the optional display 24 (FIG. 1). The VGA controller 114 is also driven from the PCI bus. An IDE controller 115 is also provided in the support module.

It is noted that the USB interface 112 and VGA controller 114 could be incorporated into the logic unit 110. An ATAPI-IDE interface (used to drive the CD-ROM or DVD player), and a PCI interface are implemented as part of the logic unit 110. For supporting higher bandwidth video applications such as multiple video screens, a P1394 interface could be added to the system and driven from the PCI interface or incorporated in logic unit 110.

The support module 82 also includes an audio signal processor 116 to perform the sound processing algorithms which may include: sound equalization, digital crossover, bass, treble, volume, surround sound, Dolby pro-logic™, AC-3 and MPEG decoding. The audio signal processor 116 also drives digital-to-analog converters for a six channel audio output (not shown). The audio signal processor 116 is preferably implemented as a DSP (digital signal processor), such as a Motorola DSP56009. The support module also includes an AM/FM tuner module 118, a GPS (global positioning system) chipset 120 to enable satellite navigation for longitude, latitude, and altitude measurements of the vehicle, and one or more audio analog-to-digital converters and digital-to-analog converters (or "CODECS") 122.

A fast data I/O memory 130 functions as a high-speed data communications buffer between the serial peripheral devices. The fast data memory is preferably implemented as a high speed SRAM (static random access memory) with high speed ping/pong buffers 132 to provide high speed buffering and "ping-ponging" of audio data or USB data that minimizes processor interaction. In the preferred implementation, the I/O memory 130 acts as a fast data memory buffer, which accommodates data exchange among many devices.

The faceplate module 80 resides on the detachable faceplate 48 (FIG. 1). The faceplate module 80 is connected to the support module 82 through a connector that facilitates easy detachability of the faceplate 48 from the main housing 36. The faceplate module 80, through the detachable connector, communicates bi-directional data to the support module 82 by means of the high-speed serial interconnect 88. The faceplate module 80 includes a logic unit 140 that can be implemented as an FPGA, ASIC, or other device. The faceplate module 80 also includes a keypad 52, a display 54 and an IrDA port. Additionally, the faceplate module 80 contains a slot for an optional plug-in RF transceiver 144 such as a cellphone, two-way pager, or point-to-point spread spectrum transceiver.

Typically, the computer module 84 resides in the dashboard-mounted base unit 46 and includes a processor in the form of a microprocessor 150, such as an Intel® x86-type microprocessor. When plugged in, the computer module 84 is connected to the PCI bus 86 to communicate with the support module 82.

The microprocessor 150 runs Windows® CE operating system from the Microsoft Corporation. The operating system is stored in ROM 152 or flash memory 154 of the support module. The computer module 84 supports any variety of applications that the vehicle user might desire. These applications can also be stored on the ROM 152, flash memory 154, DRAM 156 or on a removable storage medium (not shown), such as a CD-ROM, cassette, PC-Card Flash memory, PC-Card, hard disk drive, or floppy diskette. Additionally, user applications may be downloaded from an optional wireless Internet connection.

The computer module 84 has a PC-Card interface 158 which includes a PC-Card socket or Compact Flash used to support types I, II, or III PC-cards (e.g., extra memory, hard disk drives, modems, RF transceivers, network adapters, or other PC-Card peripherals). The computer module 84 also has an optional smart card interface 160 that accepts smart cards or similar integrated circuit (IC) cards.

A more detailed explanation of the three modules in the vehicle computer system is provided in co-pending U.S. patent application Ser. No. 08/564,586 entitled "Vehicle Computer System," which was filed on Nov. 29, 1995 in the names of Richard D. Beckert, Mark M. Moeller, and William Wong. This application is assigned to Microsoft Corporation and is incorporated herein by reference.

The logic unit 110 is configured with its own multi-bit bus structure that is separate from the bus of the microprocessor 150 of the computer module 84. The logic unit 110 and microprocessor 150 are interfaced using a bus, such as PCI bus 86. By configuring the logic unit 110 with its own internal bus, the logic unit 110 is capable of better performing its tasks independent of intervention from the microprocessor 150. Moreover, the internal bus of the logic unit 110 facilitates data communication between the audio components and other serial devices while using minimal processing resources of the microprocessor 150.

A detailed description of one implementation of the logic unit 110 is provided in co-pending U.S. patent application Ser. No. 08/668,781, entitled "Vehicle Computer System with High Speed Data Buffer and Serial Interconnect", which was filed on Jun. 24, 1996 in the names of Richard D. Beckert, Mark M. Moeller, Ron Randall, and William Wong. This application is assigned to the Microsoft Corporation and is incorporated herein by reference. The logic circuitry described in this disclosure represents another implementation of the logic unit 110 that is more specifically tailored to implement the audio entertainment system.

Audio Architecture

The computer system 20 supports an audio entertainment system. As noted above, the logic unit 110 in support module 82 performs many of the functions for the audio entertainment system. This invention is directed to the audio architecture for an audio entertainment system, such as that implemented in the computer system 20.

Figure 4:
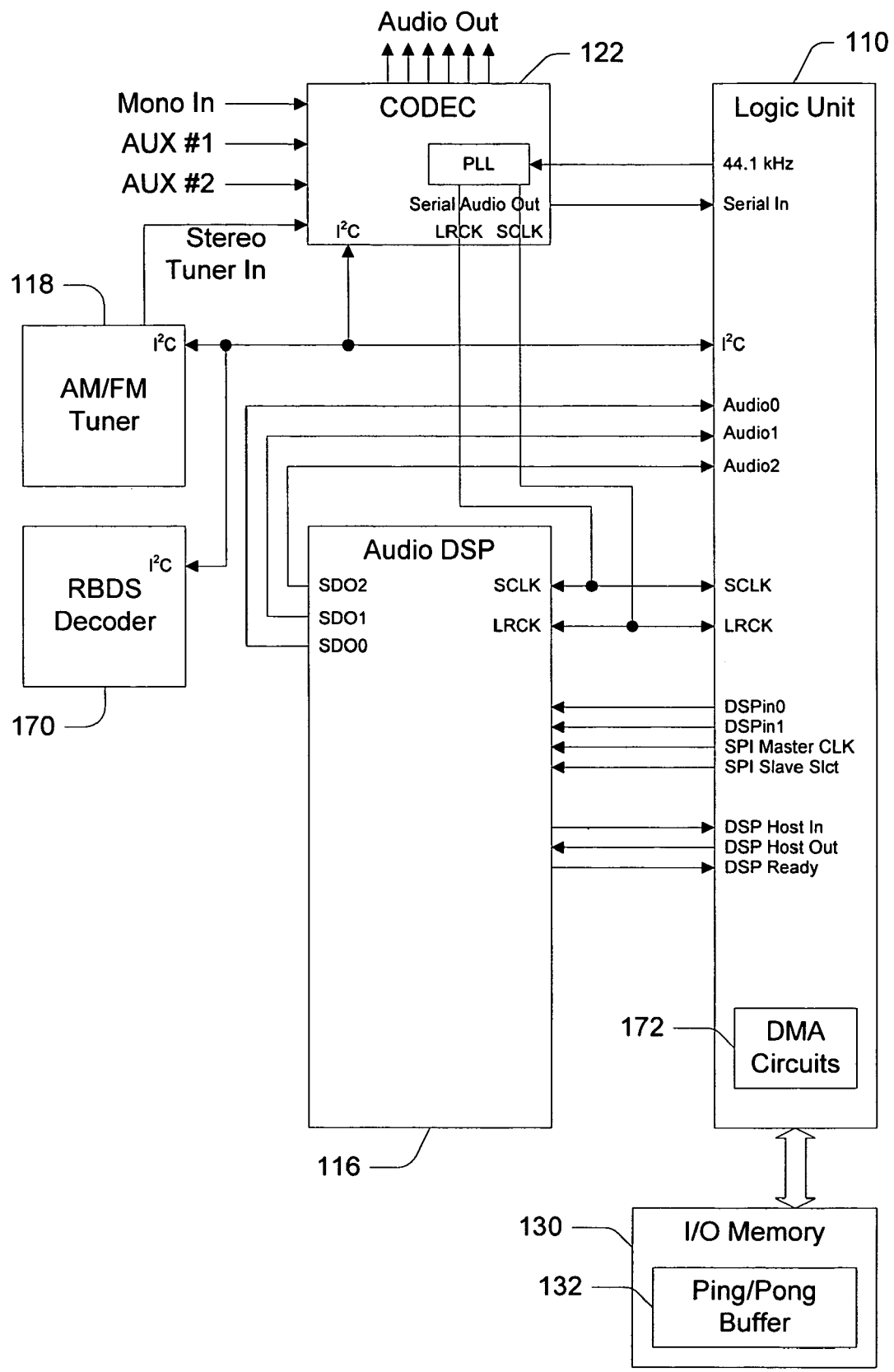
FIG. 4 is a block diagram of a logic unit and audio DSP implemented in the support module of the computer system.

FIG. 4 shows the interconnection of the logic unit 110 and the audio signal processor 116, and additionally between the logic unit 110 and other audio components controlled by the I²C bus, including the CODEC 122, the AM/FM tuner 118, and an RBDS decoder 170. In this reference design, the audio signal processor 116 is configured as a DSP in the SPI (serial peripheral interface) slave mode.

The logic unit 110 outputs two I²S serial digital audio streams DSPin0 and DSPin1 to the audio DSP 116. An identical parallel-to-serial converter circuit creates each stream. The circuit reads a parallel word from a holding register and places it into an output shift register. An I²S serial shift clock (64×44.1 kHz) that is generated externally by the CODEC 122 shifts out the shift register. The transfer of data from the holding register to the shift register is synchronized to a master SCLK signal (left, right clock) generated externally by the CODEC 122. The LRCK signal is used to indicate whether the data is associated with the left or right channel audio signal.

The two stereo audio streams are received at the DSP 116 over two separate I²S input channels and used to call any one of the numerous DSP audio algorithms, such as Surround Sound. The processed audio data is sent out from the DSP 116 back to the logic unit 110 over three separate I²S channels to a DSPout interface. The three DSP output channels include channel SD0 for the front left and front right speakers, channel SD1 for the rear left and rear right speakers, and SD2 is the center and sub-woofer. Each sound channel is 20-bit sound aligned in a 32-clock frame where the MSB (most significant bit) corresponds to the MSB for I²S and twelve "0"s follow the least significant bit.

A sound source is linked to one of the DSPin channels in logic unit 110 by a direct memory access (DMA) process of overlaying a ping/pong buffer zone in the I/O memory 130. Data from a sound source is received at a serial interface and transferred to one of the ping/pong DMA circuits 172. The DMA circuits 172 include a serial to parallel converter to convert the data to a parallel format for transfer over the logic unit's internal bus to the I/O memory 130.

An additional feature of this hardware implementation is the ability to have four stereo DMA processes all going in parallel. Two audio sources, such as wave-out and CD-ROM, could be feeding in two destinations, such as DSPin0 and DSPin1. The foreground audio source (such as navigation system instruction) can be played at the car front speakers while the background audio source (such as CD music) can be played at the car rear speakers.

General DMA Structure

Figure 5:
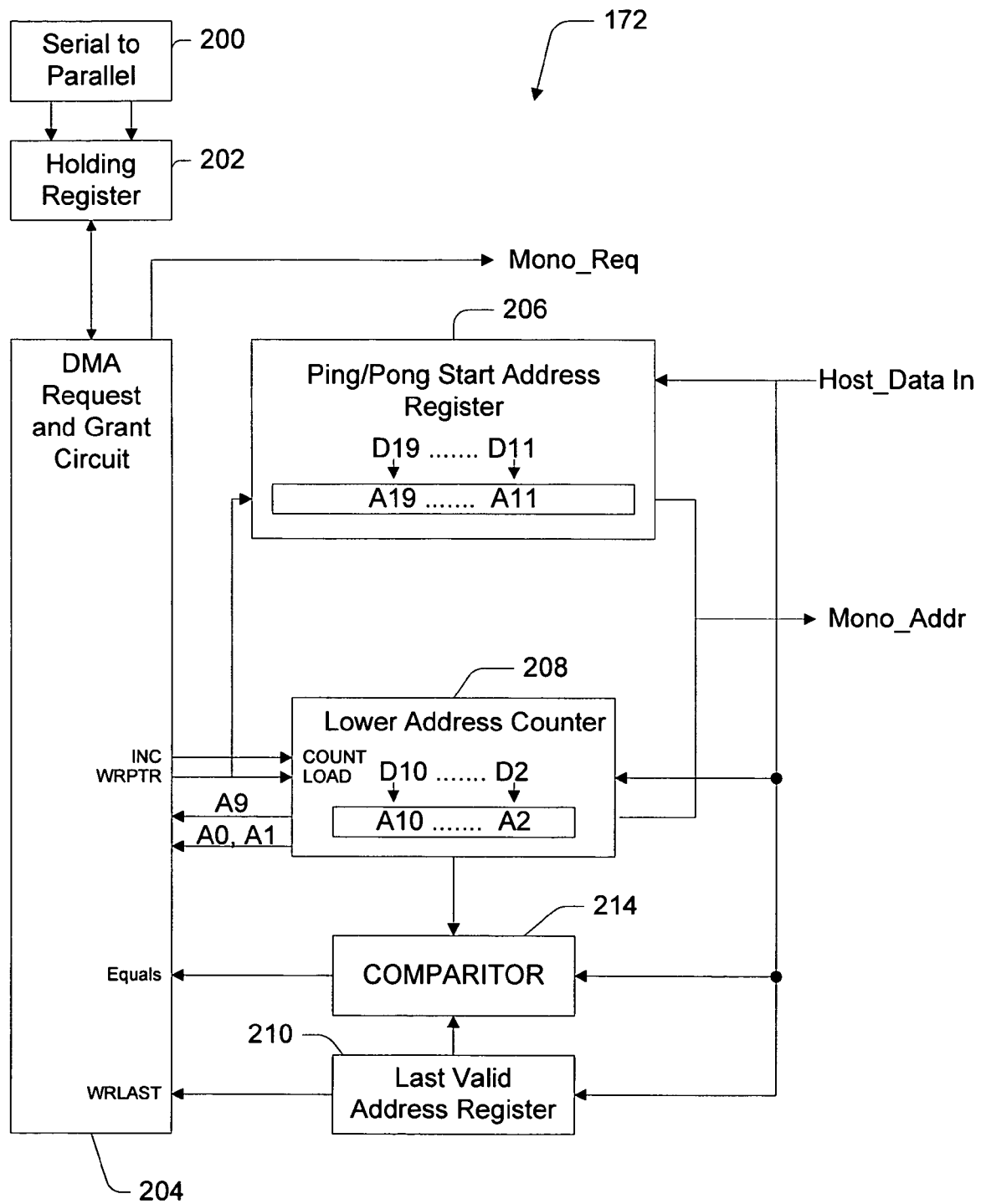
FIG. 5 is a block diagram of a memory access circuit that maps data from peripheral devices into a ping/pong buffer.

FIG. 5 shows a ping/pong DMA circuit 172 in more detail. All of the ping/pong DMA circuits are variations of the same basic design. For discussion purposes, a DMA circuit for a mono microphone receiver is shown.

The DMA circuit 172 has a serial-to-parallel converter 200 to convert the serial data received from the associated sound source peripheral device into a parallel format. The parallel data is placed initially in a holding register 202. When the holding register 202 fills, it sends a signal to the DMA request and grant circuit 204.

A DMA address pointer is formed by output from two logic components:

(1) a start address register 206 that contains the upper DMA address lines to locate an appropriate buffer area within the I/O memory 130 to hold the data received from the holding register 202, and (2) an up counter 208 that generates the lower DMA address lines for the buffer area. The computer processor initializes the DMA process by writing an address pointer to the start address register 206. The start address pointer is written into the lower address counter 208 and the upper address register 206 simultaneously. The upper address register pointer defines the beginning of the buffer area in the fast data memory 130. In this implementation, the lower address bits in the start address register 208 are used for comparison with the last valid address register. The start address of the buffer area is on a page boundary and the size of the buffer area is a pre-determined size corresponding to the page size.

The lower address counter 208 accesses the specific location within the designated buffer area of the I/O memory 130. The number of bits in counter 208 corresponds to the size of the buffer area. In this implementation, the counter employs nine address bits A2-A10, with bits A0 and A1 being set to "0". The count output by the counter 208 is used as a pointer to the specific location into which the data in the holding register 202 is to be stored. Once the data is transferred to the storage location, the counter 208 is incremented to reference the next appropriate location.

The DMA circuit 172 defines one buffer of the I/O memory, which splits into two halves: a "ping" buffer and a "pong" buffer. One half of the buffer represents a portion of the buffer area for a particular peripheral device, such as the mono input circuit, into which data is being written from that device. Conversely, the other half of the buffer represents another portion of the buffer area from which data is being read, say the DSPin DMA circuit. The I/O buffer zones for the sound source have the same beginning and end points as the zone for the DSPin data for the DSP, and hence these zones are said to be "overlaying" one another. While the source is filling up the ping memory buffer, the pong buffer is being read out to the DSPin output. When the source has filled the ping buffer, it begins filling the pong buffer. At the same time the DSPin serial output process will finish reading the pong buffer and begin reading the ping buffer.

The upper address bit A10 of the lower address counter 208 divides the buffer area into the ping and the pong buffers. When a transition of the upper counter bit occurs, an interrupt may be generated if the corresponding interrupt mask is enabled. After writing the start address pointer to the register 206 and counter 208, the processor initializes a "last valid address" register 210. This register is a latch that is the same size as the lower address counter 208. The "last valid address" register 210 also contains an enable DMA bit, which is asserted to start the DMA process.

The DMA process begins with the initial start address pointer. Each DMA cycle will cause the DMA address to increment by one unit. When the value in the lower address counter 208 equals the value in the "last valid address" register 210 as determined by comparator 212, the lower address counter 208 is reset to zeros and an interrupt is generated. The DMA process then continues from the beginning of the DMA buffer, which is on a page boundary where the page size is the size of the ping/pong buffer. When the most significant bit of the lower address counter makes a transition, an interrupt will be generated (if unmasked) to define changing between the ping and pong buffer space.

The DMA process is pre-set to occur for byte, word, or double-word size data packets. As an example, an IrDA DMA circuit employs byte size data packets (i.e., 8 bits) because this is the fundamental size of the data received. CD-ROM data is transferred in word sizes (i.e., 16 bits) which is appropriate for its bus size. An I$^2$S DMA data is transferred on a double-word size (i.e., 32 bits), which represents one left/right 16-bit data pair.

DMA address bits A0 and A1 are controlled by the appropriate DMA circuit. These bits are decoded and replaced by the four-byte select signals. The lower two bits (A0 and A1) of the lower address counter are used to select one of the byte select lines if the transfer is byte wide. The lower bit (A1) of the counter is used to select the upper pair or the lower pair of the byte select lines if the transfer is word wide. In which case, two bytes select line will be simultaneously asserted. All four byte enables will be asserted for double word transfers. In this manner, the DMA process accommodates byte, word, or double word size data packets.

In the case of a serial receive process, a serial data stream received from a peripheral device is shifted within the serial-to-parallel converter 200 to form units of 8, 16, or 32 bits in length. After the appropriate number of shifts, the data is transferred to register 202. The process of transferring data to the holding register 202 sets the REQ signal in the ping/pong DMA circuit.

Whenever the holding register 202 is full, the ping/pong DMA circuit 172 will grab the next audio word from the holding register 202 and place it in the I/O memory buffer 132. Whenever a DMA process crosses a ping or a pong boundary, an interrupt will be generated (if unmasked). This is true for both the DMA process of the audio source and for the DMA process of the DSPin channel. The reverse implied that in the case of a transmit DMA process, such as the DSPIN0 channel, when holding register is empty, the DMA ping/pong circuit will grab the next audio word from the I/O memory and place it in the holding register.

Synchronizing DMA Processes on Shared Ping/Pong Buffer

With reference again to FIG. 4, the audio architecture uses the interrupts generated in the DMA circuits 172 as a means for synchronizing two DMA processes that are sharing the same ping/pong buffer 132. Data from one DMA circuit is written into the shared ping/pong buffer 132 and subsequently read from the buffer to another DMA circuit. Depending on the audio source, the DMA circuits may write and read at different rates. In the described implementation, the output DMA circuit uses a 44.1 kHz sampling rate provided by the logic unit. However, the input DMA circuit may use a slightly different data rate. For instance, an audio device operating under its own clock signal and coupled to the USB can write audio data to the buffer 132 at a rate that is not exactly 44.1 kHz. As a result, the input DMA clock rate may not exactly match the output DMA clock rate because they are controlled by different clock circuits.

In the preferred implementations, different thread and device drivers control the reading and writing DMA processes of the shared ping/pong buffer. A designer of an audio source needs only to construct a device driver to fill the shared buffer at its clocked rate.

Consider the following examples. In the first scenario, the writing and reading DMA processes are both based on the 44.1 kHz master clock. To illustrate this scenario, suppose that the AM/FM tuner 118 is the source of the audio data. The audio data output from the AM/FM tuner 118 is digitized by the CODEC 122 and output as an I$^2$S audio stream to the logic unit 110. The logic unit 110 converts the I$^2$S stream into a left and right pair of 16-bit words and a first DMA circuit for the AM/FM tuner writes the pair of words to the "ping" portion of the buffer indicated by the DMA pointer. While the AM/FM tuner data is being written to the ping memory, a second DMA circuit is simultaneously reading data from the corresponding "pong" portion of the buffer memory process and outputting that data to the DSPin output. Since both the writing and reading processes are at 44.1 kHz, the toggle between ping and pong occurs simultaneously in both incoming and outgoing data. The interrupts generated by both incoming and outgoing toggles can be ignored, unless the computer has some interest in the data (such as sending it to USB or to disk).

In the second scenario, the source writes data at a rate slightly different from the internal 44.1 kHz. Suppose, for example, a CD-ROM player is the source of the data. In this case, a ping/pong memory buffer 132 is configured to overlap the CD-ROM memory space with the memory space of the DSPin output. A DMA circuit 172 associated with the CD-ROM fills the "ping" memory buffer with bytes of audio data plus some number of words of sub-channel data. Simultaneously, the DMA circuit for the DSPin output is reading data out of the "pong" memory buffer at the 44.1 kHz rate.

Next, suppose that the CD-ROM player reads audio data from the CD-ROM disk at the audio rate of 44.1 kHz. At this rate, the CD-ROM player makes a block of 2,352 bytes of audio data every 1/75 of a second. When this block is ready, the CD-ROM player activates the DMA request line, transfers the block of data quickly, and deactivates the line until it receives the next block. The DMA circuit generates an interrupt at the end of the block transfer. As a result of this process, the audio data rate of the CD-ROM player may be slightly different than the 44.1 kHz master clock that drives the audio DSP 116 and CODEC 122.

To synchronize these two data streams, the software device drivers use the logic unit 110 to measure the time between the block data transfers of the CD-ROM player and adjusts the master audio clock of the support module to match the CD-ROM data rate.

Figure 6:
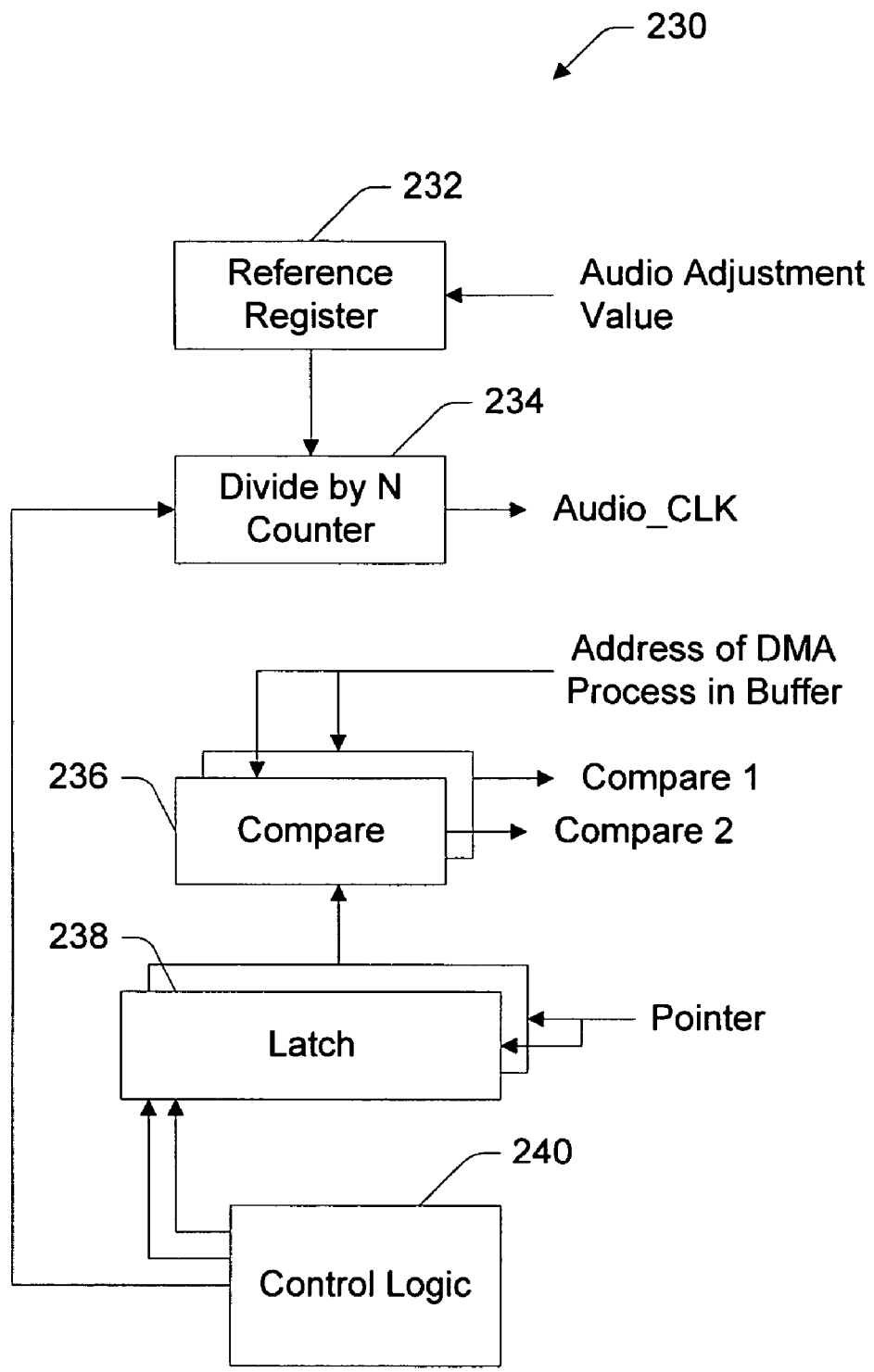
FIG. 6 is a block diagram of a master clock adjuster circuit.

FIG. 6 illustrates a master clock adjuster circuit 230 implemented in the logic unit 110. The master audio clock adjuster 230 has a reference register 232, a divide by N counter 234, two comparators 236, two latches 238, and control logic 240. The two comparators 236 help determine the rate at which data is being written into a ping/pong buffer. The host computer writes a pointer to the latches 238. The pointer corresponds to an address in the I/O memory 130 of a ping/pong buffer 132. Any operation that writes data to that address causes an interrupt to be generated to the host (if unmasked). When the interrupt occurs, the computer reads the address position of the DMA process as it is reading data out and based on this position, determines if the data rate coming in matches the rate going out.

When the rates differ, the computer sends a value to the reference register 232. This value is input to the divide by N counter 234 to generate the reference audio clock rate for the digital audio channels on the support module. Normally, the reference audio clock is 44.1 kHz. However, the computer can submit a value that adjusts the reference audio clock to speed up or slow down the rate that the data is read out in order to synchronize to the data rates of incoming audio streams.

In the software design, one single shared memory buffer can be used for multiple input devices to write data into and for only one output device to read data from. The reading and writing DMA processes of the shared ping/pong buffer are controlled by different threads and device drivers. The objective here is to write a standard output device driver to fit most audio sources. The audio source device driver is only required to fill the shared buffer at its own rate.

One alternative to using a single shared buffer among various audio sources is to have multiple shared memory buffers for corresponding ones of the audio sources. Each audio source uses its own buffer and the output device driver switches among different input buffers when the current audio source changes. The drawback with this implementation is that it requires more memory space. In addition, it is not necessarily easy for the new audio source to notify the output device driver about the new audio-shared buffer.

As mentioned above, the writing thread (controlled by the audio source device driver) is filling into the shared buffer at the device controlled clock rate that is at roughly 44.1 k sampling rate. If the reading thread is also running at the same clock rate (for example, radio), there is no problem. However, for the peripheral devices (such as CD and USB devices), the clock rate will not exactly match. Sooner or later there will be output noise since the input DMA and output DMA may catch up each other and start accessing the same ping/pong buffer section. For the reading thread to adapt its clock to match the writing thread, the system employs the write-notification interrupt (which triggers when the middle DWORD of the ping/pong buffer is written). By looking at the regular read-done interrupts and this write-notification interrupt, the reading thread can adapt its clock to match the writing DMA.

When the reading thread detects the first write interrupt, it can start reading. For any consequent write interrupt, it is able to find out where it is currently reading from the buffer. From that information, it can increase or decrease the reading clock to match the writing thread. When it detects two read interrupts without one write interrupt, it can auto-stop the operation.

Bus Arbiter

Figure 7:
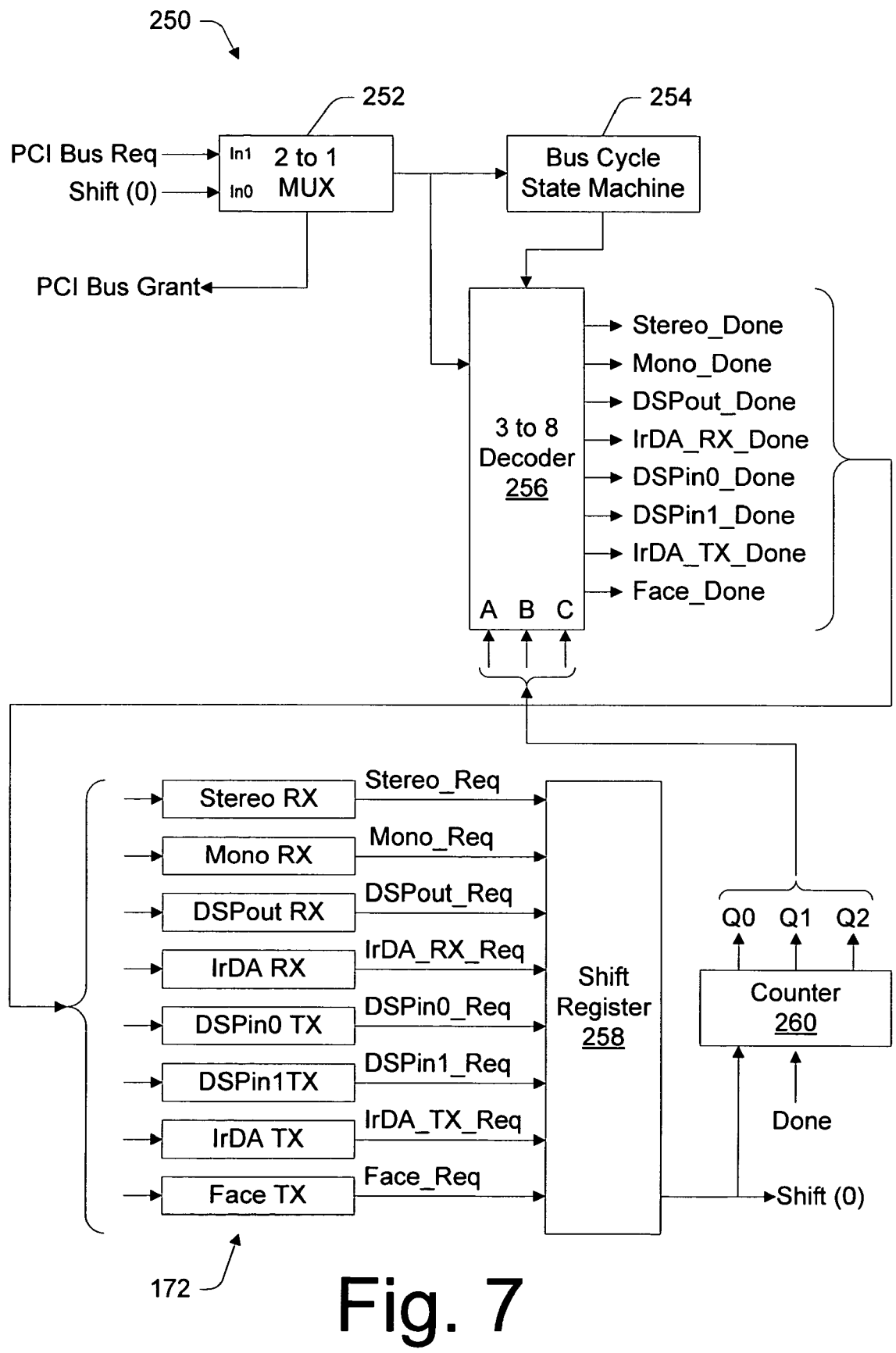
FIG. 7 is a block diagram of a bus arbiter circuit.

FIG. 7 shows a bus arbiter circuit 250 that controls access to an internal bus. This internal bus is used to access between the PCI bus DMA circuit and the I/O memory. The bus arbiter circuit 250 toggles a 2-to-1 multiplexor 252 back and forth between bus requests received from the PCI bus 86 and DMA requests received from the DMA circuits 172 in logic unit 110. The bus arbiter circuit 250 grants the PCI bus 86 one-half of the available time on the internal bus and spreads the remaining one-half time among the 8 DMA processes, all of which can be simultaneously enabled. In the future we may have more than 8 DMA support.

In the illustrated example, the arbiter circuit 170 supports eight DMA circuits: stereo, mono, DSPout (i.e., the audio signal processor), IrDA receive, DSPin0, DSPin1, IrDA transmit, and faceplate. These eight circuits share the remaining one-half bandwidth to the internal bus, and hence each DMA circuit is guaranteed one-sixteenth of the bus bandwidth. Note that the CD-ROM writes to the I/O memory using the PCI DMA process.

When the 2-to-1 multiplexor 252 decodes an active request, it stops the toggling process and initiates a bus cycle state machine 254 for the logic unit's bus. The active request also grants the internal logic unit bus to either the PCI bus or to one of the internal DMA circuits as selected by a decoder 256.

A shift register 258 loads all pending requests from the DMA circuits. The output of the shift register 258 is the enable to a counter 260. Each time the shift register 258 is shifted, the counter 260 counts. When the output from the shift register 258 indicates an active DMA request, the counter 260 and the shift register 258 stop. When the 2-1 multiplexor 252 toggles to the DMA devices, the active request from the shift register 258 halts the toggling and starts a bus cycle for a DMA request. After the completion of the bus cycle, a "done" signal is generated to the appropriate DMA circuit, releasing the DMA request line and causing the 2-to-1 multiplexor 252, the shift register 258, and the counter 260 to continue to look for the next active DMA request.

Audio Manager API

The computer system 20 is a fully functional, general-purpose computer that supports an audio entertainment system. The system 20 is designed to support multiple audio sources, such as radio, CD, Auxiliary inputs, and CD changer. The audio DSP 116 handles the sound equalization, surround sound decoding, and volume/balance/fade controls. The audio can be played to a speaker system (e.g., six speakers) or to any USB client.

The computer system 20 implements an audio manager API (application program interface) to enable applications running on the computer to control the various audio sources without knowing the hardware and implementation details of the underlying sound system. Different audio devices and their drivers control different functionality of the audio system, such as equalization, volume controls and surround sound decoding. The audio manager API transfers calls made by the applications to the appropriate device driver(s).

Figure 8:
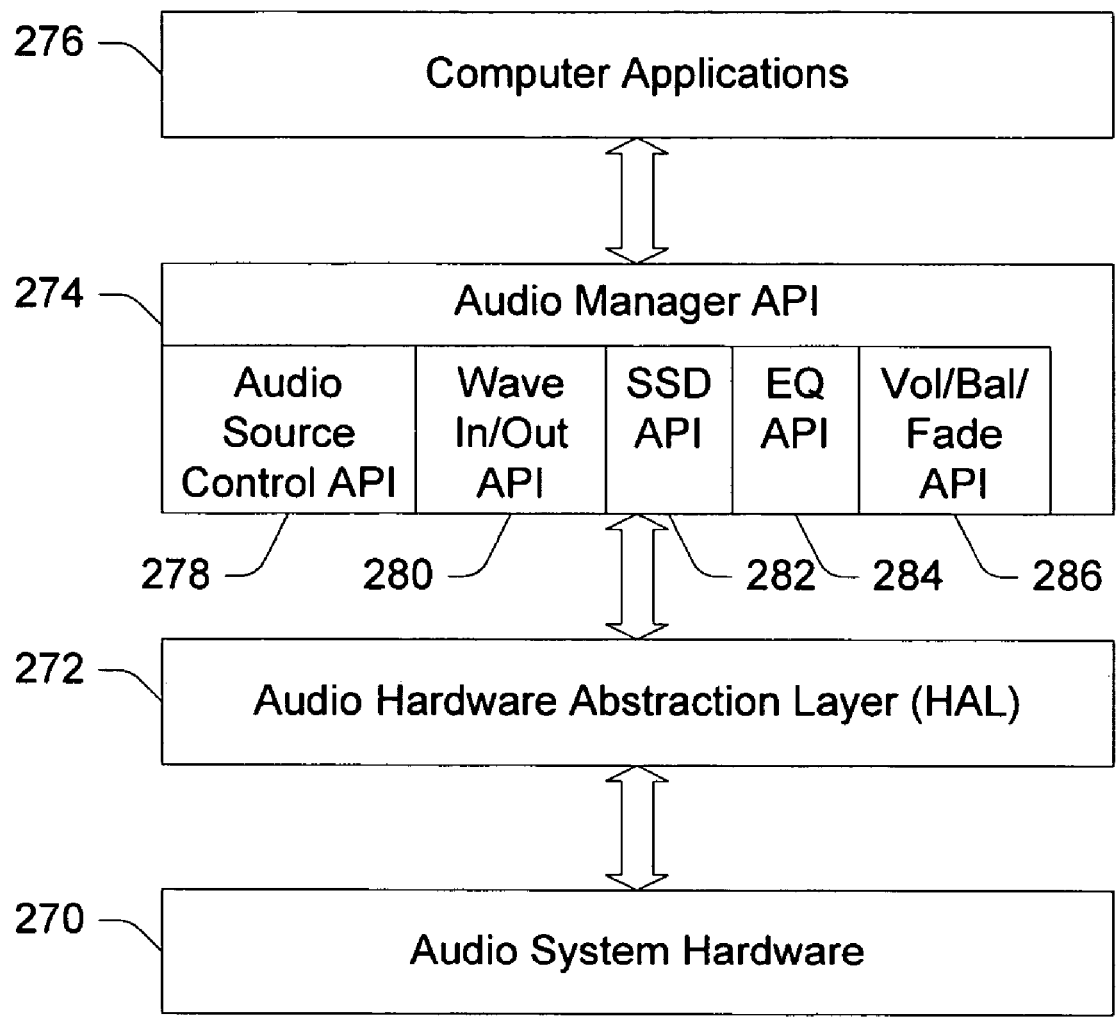
FIG. 8 shows an audio software/hardware interface architecture.

FIG. 8 shows the application-to-hardware architecture. The audio hardware 270 forms the lowest level in the architecture. An audio hardware abstraction layer (HAL) 272 defines a basic interface layer between the audio related drivers for the hardware 270 and the audio manager API layer 274. Atop the audio manager API 274 are the applications 276. The audio manager API 274 defines the APIs to access and control the underlying audio system.

The audio manager API 274 has five core components: audio source control API 278, wave-in and wave-out API 280, surround sound decoder API 282, equalization API 284, and volume/balance/fade API 286. Different APIs control different aspects of the audio system. Together, they provide a convenient API for the applications 276.

The audio sources are generally categorized into two kinds: foreground audio sources and background audio sources. Foreground audio sources include a computer wave file output and text-to-speech output. Foreground audio sources are mixed with active background audio sources. The foreground audio sources are controlled by the wave-out API. In contrast, the background audio sources include AM/FM tuner, CD player, auxiliary inputs, and other sources from the USB. Background sources are controlled by the audio source control API.

Although the audio system can have more than one destination, such as speakers, USB devices, and the computer, the main destination is the speakers. Hence, any one of the selected multiple audio sources eventually converge to one audio destination—the speaker system.

Figure 9:
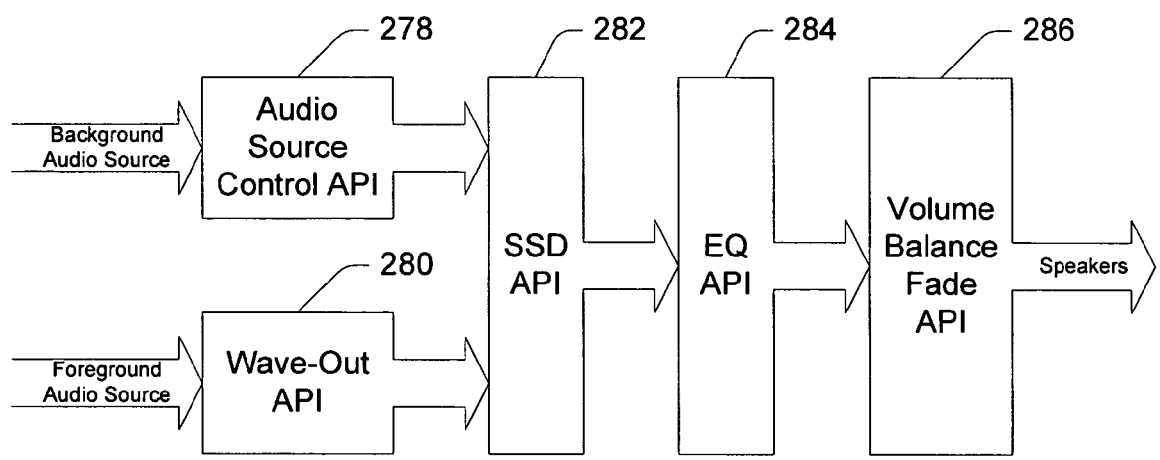
FIG. 9 is a functional diagram illustrating audio data flow in an audio manager API.

FIG. 9 shows how the audio manager API modules control the audio flow path.

The audio source control API 278 is used to select the background audio source. It serves as the coordinator between the different audio applications that control different pieces of the audio system. For example, while the AM/FM tuner is playing and the operator elects to play a CD, the audio source control API 278 serves to coordinate stopping the tuner and starting the CD player. Table 1 lists the functions of the audio source control API 278.

TABLE 1

Audio Source Control API 278

| Name | Function |
| --- | --- |
| GetNumSources | Returns the total number of registered audio sources. |
| GetSourceCaps | Provides information on a specific audio source. |
| RegisterCallback | Registers a callback thread. |
| SelectSource | Selects the specific audio source to play. |

The wave-in and wave-out API 280 are compatible with the Win32 Wave APIs documented in a standard Windows SDK, such as the SDK for the Windows CE operating system. For more information on these APIs, the reader is directed to the noted SDK.

The surround sound API 282 enables surround sound decoding. It contains member functions to enable and disable SSD, set the surround sound delay time, and set a cut-off frequency of a subwoofer low pass filter. Table 2 lists the functions of the surround sound API 282.

TABLE 2

Surround Sound API 282

| Name | Function |
| --- | --- |
| EnableSSD | Enables or Disables the surround sound decoding. |
| SSDControl | Controls the surround sound decoding algorithm. |

The equalization API 284 changes the equalization settings. Table 3 lists the functions of the equalization API 284.

TABLE 3

Equalization API 284

| Name | Function |
| --- | --- |
| GetEQCaps | Receives various properties of the audio equalizer. |
| EQPreset | Selects an equalization preset: Pop, Country, Rock, Classical, etc. |
| EQBandControl | Controls gain, center frequency, and bandwidth of each band. |
| FilterControl | Controls the crossover filters |

The volume/balance/fade API 286 changes the volume, balance, and fade. Table 4 lists the functions of the volume/balance/fade API 286.

TABLE 4

Volume/Balance/Fade API 286

| Name | Function |
| --- | --- |
| VolumeControl | Controls Volume, mute, balance, fade, center, and woofer. |

With reference again to FIG. 8, the audio manager API 274 communicates with the audio device drivers for specific devices via the audio HAL interface 272. To work with applications 276, each device driver supports the following set of interfaces listed in Table 5.

TABLE 5

Interfaces for HAL 272

| Name | Function |
| --- | --- |
| IUnknown | Default interface used to query for availability of all interfaces. |
| ISource | Interface between the Audio source control API and the audio source drivers. |
| IEQ | Interface for audio equalization. |
| ISSD | Interface for surround sound decoding of DSP. |
| IVolume | Interface for volume/balance/fade control. |

To play an audio source, there are usually more than one device involved. For example, to play a CD, a shared-buffer device is first prepared before the CD driver sends the audio data to the shared-buffer. To establish any dependencies between devices, all audio related device drivers register themselves and specify what device driver it depends on.

If an application wants to play an audio source, it calls SelectSource with the audio source ID as its parameter. The audio manager API deselects any current audio source and selects the source requested by the application. To deselect the current audio source, the audio manager API traverses through the link list structure and informs each source or dependent device of its termination. To select the new source, it informs the source and dependent devices of their initiation.

DSP SPI for Microphone Interface

The computer system 20 supports a speech recognition system, such as a control and command, discrete speech recognition system. All audio data, including the speech utterances picked up by the microphone jack 72, are sampled at the 44.1 kHz sampling rate supplied by the CODEC. However, the speech recognition system may employ a different sampling rate. In the described implementation, the speech recognition system employs a significantly slower 11 kHz sampling rate. Rather than add an additional A/D converter just for microphone data (which would add cost), the system 20 converts microphone data from the higher 44.1 kHz sampling rate to the desired 11 kHz.

One approach would be to record the data at 44.1 kHz in the computer and allow the host computer to perform sampling rate conversion. However, this approach is less desirable because it consumes resources of the computer.

A more preferred approach is to perform the sampling rate conversion in the audio DSP 116 or in the logic unit 110. However, since the I²S interfaces are all dedicated elsewhere, an aspect of this invention is to piggyback the microphone data with command/message streams received at the SPI (serial peripheral interface) of the audio DSP. The microphone data is piggybacked with commands from the host CPU and sent into the DSP via the SPI. The DSP performs normal low-pass filtering and down sampling on the data stream and then uses the SPI to send out the microphone data back out at its new 11 kHz sampling rate piggybacked with the message stream.

Figure 10:
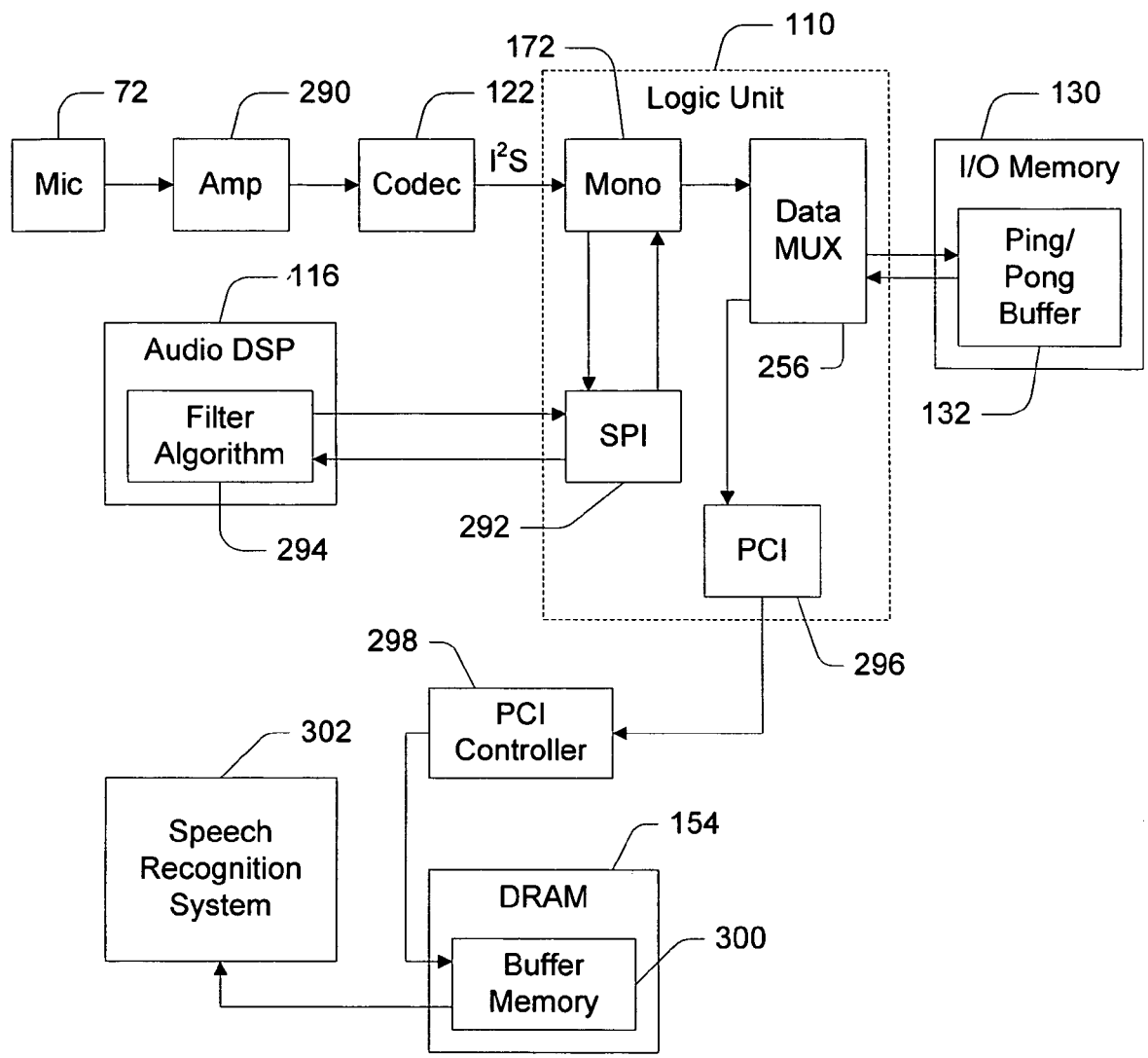
FIG. 10 is a block diagram illustrating use of an SPI port to exchange voice data between the audio DSP and logic unit.

FIG. 10 shows the flow of microphone data up to the point where it is presented to the host CPU for speech recognition processing. An analog signal generated by microphone 72 is amplified in amplifier 290 and input into the mono channel of the CODEC 122. The CODEC 122 digitizes the analog microphone signal at 20 bits of resolution and a sampling rate of 44.1 kHz. The 20 bits are aligned in a 32-clock frame where the MSB corresponds to the MSB for I²S and 12 0's follow the least significant bit. The CODEC sends the 20 bits of microphone data to the logic unit 110 in the I²S.

The logic unit 110 receives the serial I²S data and converts it into parallel data in the mono DMA circuit 172, as shown in FIG. 5. The mono DMA circuit 172 presents the 20 bits of mono data to the SPI module 292, which converts the mono data into a 24-bit SPI serial transaction to the audio DSP 116. It is noted that the DSP 116 can be simultaneously receiving two channels of I²S audio from the DSPin TX ping/ping DMAs, for a total of three audio input streams, with the mono audio stream piggybacked with the command/message streams.

The audio DSP 116 applies a bandpass filter 294 to the mono data and then decimates the data to an 11 kHz stream by keeping one of every four filter output samples and discarding the other three. After each fourth SPI mono input transaction, the DSP returns a valid filtered mono output data to the logic unit 110. For each 44.1 kHz period, a microphone data word is sent to the DSP. However, only after each fourth microphone word sent does a filtered microphone word come back from the DSP representing a microphone data at a new sampling rate of 11 k. For each word sent to the DSP, a word is returned. In other words, for each four words sent to the DSP, the DSP returns one word marked as filtered data and three words marked as invalid data.

The SPI module 292 converts the 16 most significant bits of the filtered mono data into parallel and presents them back to the mono DMA circuit 172.

The mono DMA circuit 172 asserts a DMA request signal after it has stored two consecutive 16-bit filtered words in its holding register. The data is transferred via the multiplexor 256 into a ping/pong buffer 132. When the ping buffer is filled, an interrupt is generated to the host CPU. A PCI DMA circuit 296 reads the mono data from the ping buffer in I/O memory 130 in response to instructions from a PCI controller 298, and dumps the data to a buffer 300 in the local host memory 152. The speech recognition software 302 retrieves blocks of the mono data from the buffer 300 for processing.

If the host writes a command to the SPI data register in the logic unit 110, the SPI interface logic will send this command word to the audio DSP 116 immediately following the next microphone data transaction. Since the mono audio data does not utilize the full bandwidth of the SPI bus, the command/message stream can be interleaved with the mono data. After the audio DSP is reset, it will expect to load 512 (24-bit) words from the SPI port that will contain its executable program or a program to load a larger executable program. In this circumstance, the SPI control register contains bits that will disable the microphone data feed, and enable data written to the SPI data port to be sent directly to the DSP. In this mode, all data received from the DSP is ignored.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. An entertainment system for a vehicle comprising:
    a housing of a size suitable to be mounted in a vehicle dashboard;
    a faceplate module residing on a faceplate attached to the housing;
    a computer module having a first processor configured to execute one or more applications; and
    a support module mounted within the housing, the support module being coupled to the computer module and the faceplate module via a communications bus, the support module including:
        a data memory including one or more ping/pong buffers;
        a data processor to process audio data; and
        a logic unit configured to receive audio data from one or more peripheral audio sources, the logic unit including one or more audio source direct memory access (DMA) circuits, with each audio source DMA circuit being associated with a specific peripheral audio source, and a data processor DMA circuit associated with the data processor,
    wherein each audio source DMA circuit is configured to:
        write audio data received from a peripheral audio source to which the audio source DMA circuit is associated to a storage area within the data memory, while the data processor DMA circuit reads previously written audio data from the storage area within the data memory;
    and further wherein the data processor DMA circuit is configured to:
        transmit the previously written audio data to the data processor.

2. An entertainment system for a vehicle as recited in claim 1, further comprising a synchronization circuit to synchronize a first rate at which a first audio source DMA circuit writes the audio data into the data memory with a second rate at which the data processor DMA circuit reads the previously written audio data from the data memory.

3. An entertainment system for a vehicle as recited in claim 1, wherein the logic unit concurrently transfers audio data from multiple different audio sources to the data processor for concurrent processing.

4. An entertainment system for a vehicle as recited in claim 1, wherein the one or more audio source direct memory access (DMA) circuits are configured to write audio data to a ping buffer in the storage area while the data processor DMA circuit reads previously written audio data from a pong buffer in the storage area.

5. An entertainment system for a vehicle as recited in claim 4, further comprising a master clock adjuster circuit configured to monitor a first rate at which the audio data is written to the ping buffer and adjust a reference audio clock associated with the data processor DMA circuit reading the previously written audio data from the pong buffer at a second rate such that the first rate is equal to the second rate.

6. An entertainment system for a vehicle as recited in claim 1, wherein the one or more peripheral audio sources include one or more of:
   a security system;
   a navigation system;
   a CD-ROM changer;
   a television tuner.

7. An entertainment system for a vehicle as recited in claim 1, wherein the communications bus coupling the faceplate module and the support module includes a high speed serial interface, and further wherein the communications bus coupling the support module to the computer module includes a multi-bit bus.

8. An entertainment system for a vehicle as recited in claim 1, wherein the logic unit is further configured to establish a master audio clock signal for use throughout the entertainment system.

9. A vehicle computer system comprising:
   a housing having a base unit and a faceplate;
   a first processor mounted to the faceplate to form a faceplate module;
   a computer module having a second processor; and
   a support module mounted to the base unit, the support module being coupled to the computer module and the faceplate module via a communications bus, the support module including:
      an AM/FM tuner module
      a data memory including one or more ping/pong buffers;
      a digital signal processor; and
      a logic unit configured to receive audio data from the AM/FM tuner module and one or more peripheral audio sources, the logic unit including an audio source DMA circuit associated with the AM/FM tuner module and one or more other audio source DMA circuits associated with specific ones of the one or more peripheral audio sources, and further wherein the logic unit includes at least one data processor DMA circuit associated with the digital signal processor,
   wherein each audio source DMA circuit is configured to:
      write audio data to a ping buffer within the data memory, while the at least one data processor DMA circuit reads audio data from a pong buffer within the data memory.

* * * * *